United States Patent [19]
Minchey et al.

[11] Patent Number: 5,673,881
[45] Date of Patent: *Oct. 7, 1997

[54] METHOD AND APPARATUS FOR ASSEMBLING TABLE LEGS

[75] Inventors: Richard L. Minchey, Goodlettsville; William E. Surface, Portland, both of Tenn.

[73] Assignee: Sunbeam Products, Inc., Delray Beach, Fla.

[*] Notice: The term of this patent shall not extend beyond the expiration date of Pat. No. 5,549,265.

[21] Appl. No.: 584,772

[22] Filed: Jan. 11, 1996

Related U.S. Application Data

[63] Continuation of Ser. No. 222,197, Apr. 1, 1994, Pat. No. 5,549,265.
[51] Int. Cl.[6] .................................................. F16M 11/16
[52] U.S. Cl. ........................... 248/188.2; 29/464; 29/466; 29/525.12; 29/897; 248/188.7; 403/337
[58] Field of Search ................................ 248/188, 188.1, 248/188.2, 188.8, 431; 403/337, 335, 217, 170; 29/464, 466, 525.01, 897

[56] References Cited

U.S. PATENT DOCUMENTS

| | | |
|---|---|---|
| 1,828,235 | 10/1931 | Van Hattum . |
| 1,913,097 | 6/1933 | Wallis . |
| 2,731,334 | 1/1956 | Wissmiller et al. . |
| 3,095,908 | 7/1963 | Plummer . |
| 3,261,584 | 7/1966 | Miller .................................. 248/188.2 |
| 3,366,079 | 1/1968 | Koransky et al. ................... 248/431 X |
| 3,420,032 | 1/1969 | Felt . |
| 5,230,491 | 7/1993 | Tseng ................................. 248/188 X |
| 5,292,101 | 3/1994 | Henson ................................... 248/526 |
| 5,549,265 | 8/1996 | Minchey et al. ..................... 248/188.2 |

*Primary Examiner*—Ramon O. Ramirez
*Attorney, Agent, or Firm*—Carol I. Bordas; Michael J. Kline

[57] ABSTRACT

An apparatus for connecting at least two leg members to form a table leg assembly, comprising: a tab bracket disposed on each of said leg members; at least two ganging brackets matingly engageable with said tab brackets; and connecting means for removably connecting said ganging brackets with said tab brackets.

10 Claims, 3 Drawing Sheets

METHOD AND APPARATUS FOR ASSEMBLING TABLE LEGS

This application is a continuation of application Ser. No. 08,222,197, filed Apr. 1, 1994, now U.S. Pat. No. 5,549,265.

FIELD OF THE INVENTION

The present invention relates particularly to a method and apparatus for assembling the legs of a table.

BACKGROUND OF THE INVENTION

The present invention relates to improvements in the methods and components used for assembling the legs of a table, including patio tables having wrought iron leg assemblies.

It is known in the art to employ bolts, screws or similar fasteners to connect together a plurality of table leg members and/or cross members to form a table leg assembly. Depending on the size and weight of the leg assembly, varying numbers and sizes of such bolts or fasteners would be used in an attempt to the provide strength and stability to the leg assembly and ultimately to the table supported thereby. Several disadvantages, aside from increased costs and assembly time, are associated with using a large number of bolts to construct a table leg assembly. If such bolts are tightened excessively or in an improper sequence, one or more of the leg members of the assembly may become uneven with respect to the others resulting in a table that is uneven or worse yet, unstable. Furthermore, such prior art fastening devices for leg assemblies do not generally allow the height of individual leg members to be adjusted relative to each other in order to provide a level table top when the table is placed on an uneven surface. For such purpose, prior art leg assemblies usually include an adjusting means disposed directly on the bottom ends of the individual leg members.

Accordingly, it is the object of this invention to provide a new and improved method and apparatus for assembling the legs of tables which overcome the deficiencies in the prior art.

Another object of the present invention is to provide a new and improved method and apparatus for assembling table legs which reduces the number of fasteners needed to construct the leg assembly, as well as the time required for doing so.

An additional object of the present invention is to provide a new and improved method and apparatus for assembling table legs whereby the fastening components allow the height of the individual leg members to be adjusted to produce a level table top, even when the leg assembly is placed on an uneven surface.

SUMMARY OF THE INVENTION

The present invention comprises an apparatus and method for connecting leg members and/or cross-members to build a table leg assembly for supporting a table top. The apparatus of the present invention comprises a tab bracket disposed on each leg member of the assembly and a plurality of ganging brackets having angled ear portions, each of such ear portions matingly engaging a tab bracket disposed on a leg member. The ear portions of the ganging brackets have shear tabs protruding therefrom which are received in holes in the tab bracket. Also, both the ear portions and their corresponding tab bracket have at least one hole each for receiving a connecting means, such as a bolt or screw, for positively and removably connecting the ganging brackets with the tab bracket.

These and other features and advantages of the preferred embodiments of the present invention will become readily apparent from the following detailed description of the preferred embodiments, the claims appended hereto, and from the accompanying drawings illustrating the preferred embodiments of the present invention.

BRIEF DESCRIPTION OF THE DRAWING

In the accompanying drawings, the preferred embodiments of the invention and preferred methods of practicing the invention are illustrated in which.

DETAILED DESCRIPTION OF THE PREFERRED EMBODIMENTS

Figure 1:
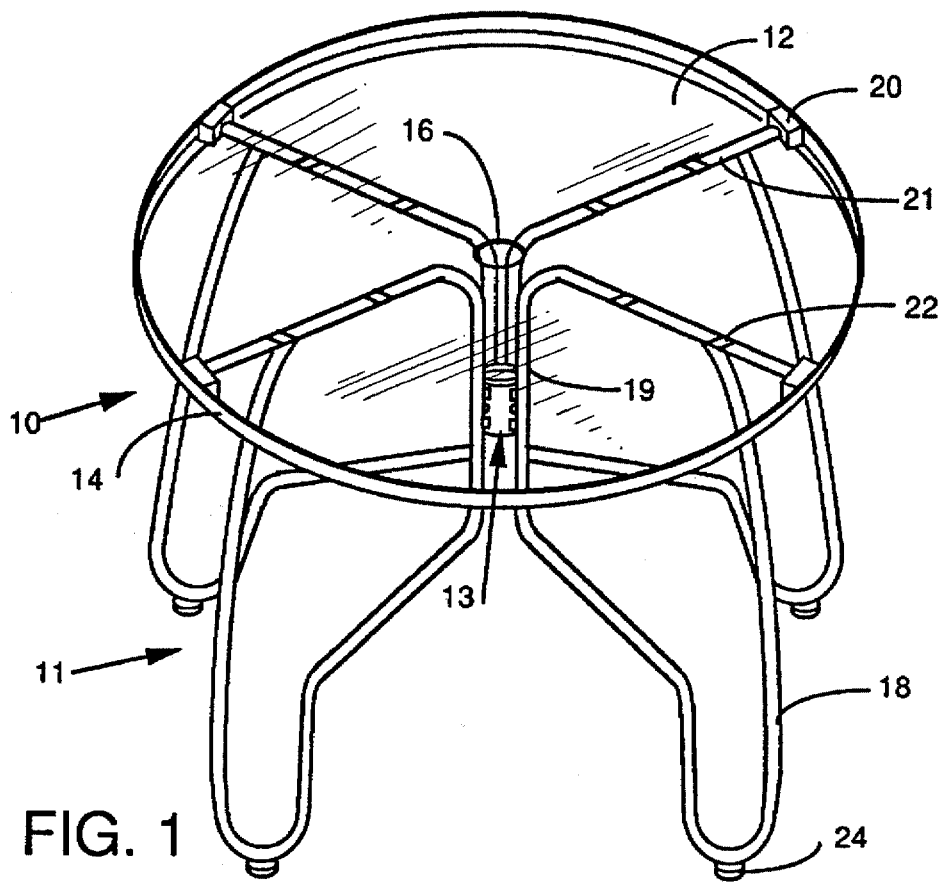
FIG. 1 is a front perspective view of a table having a leg assembly constructed using the method and apparatus of the present invention.

FIG. 1 shows a table 10 having a leg assembly 11 constructed with the connecting apparatus 13 (shown more clearly in FIGS. 2–4) which comprises a preferred embodiment of the present invention. As shown in FIG. 1, the table 10 comprises a table top 12, table rim 14 and table leg assembly 11. The table top 12 may comprise a transparent material (as illustrated) or an opaque material. Each leg member 18 of the table leg assembly 11 has at least one vertical portion 19. A base cap 24, such as a washer, may be disposed on the portion of the leg member 18 which would otherwise contact the ground or floor. As further shown in FIG. 1, the leg members 18 are connected together by the connecting apparatus 13 to form table leg assembly 11, which is in turn connected to table rim 14 through the use of leg/rim connector blocks 20 fastened to the table rim 14 by screws or the like (not shown). The end of each horizontal portion 21 of the leg members 18 is received in a hole in the side of a leg/rim connector block 20. The table top 12 contains a hole through which an umbrella (not shown) may be inserted, or may otherwise receive a hole plug 16 when an umbrella is not being used. The table top 12 rests on the leg/rim connector block 20 and on spacers 22 disposed on the horizontal portions 21 of the leg members 18.

Figure 2:
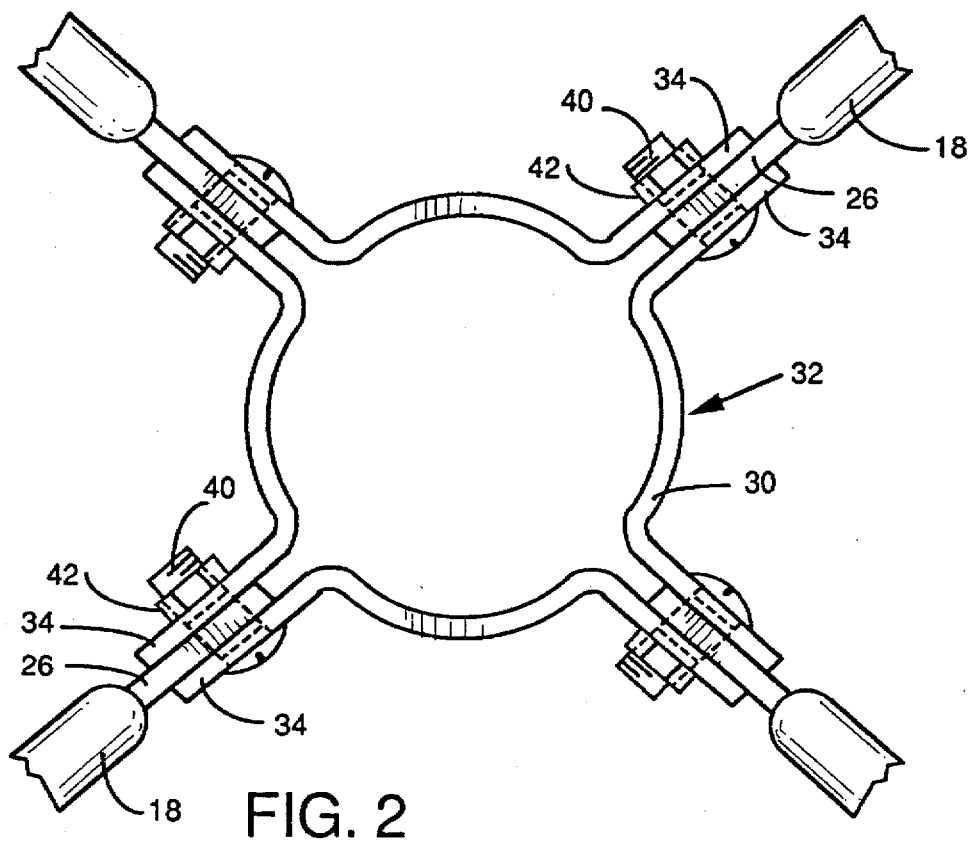
FIG. 2 is a fragmentary top plan view of the table leg assembly of FIG. 1 isolating the assembled components of the apparatus of the present invention.
Figure 3:
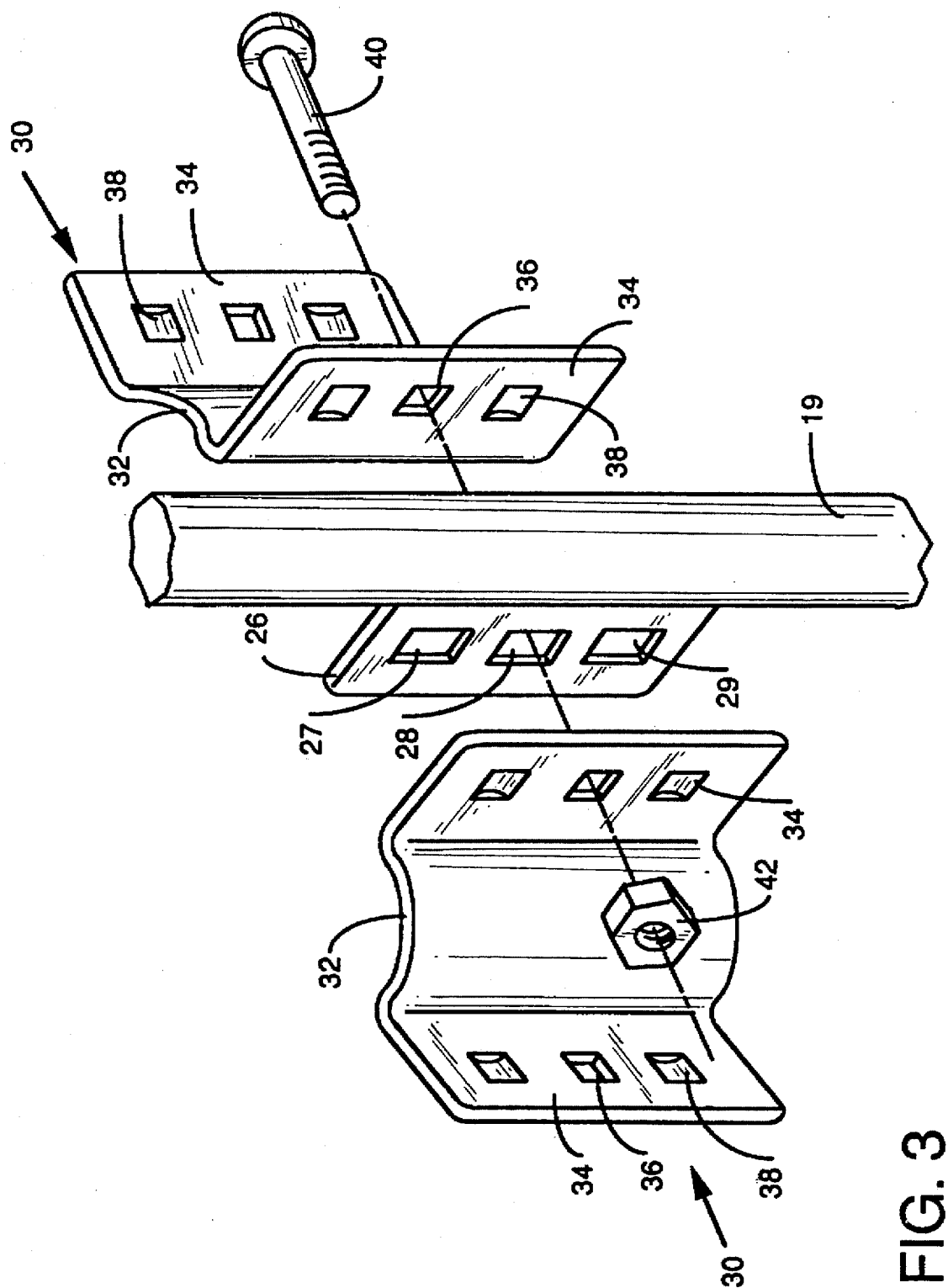
FIG. 3 is a fragmentary, front perspective, exploded view of a portion of the table leg assembly of FIG. 1 showing the components of the apparatus of the present invention in vertical alignment but unassembled in a lateral sense.
Figure 4:
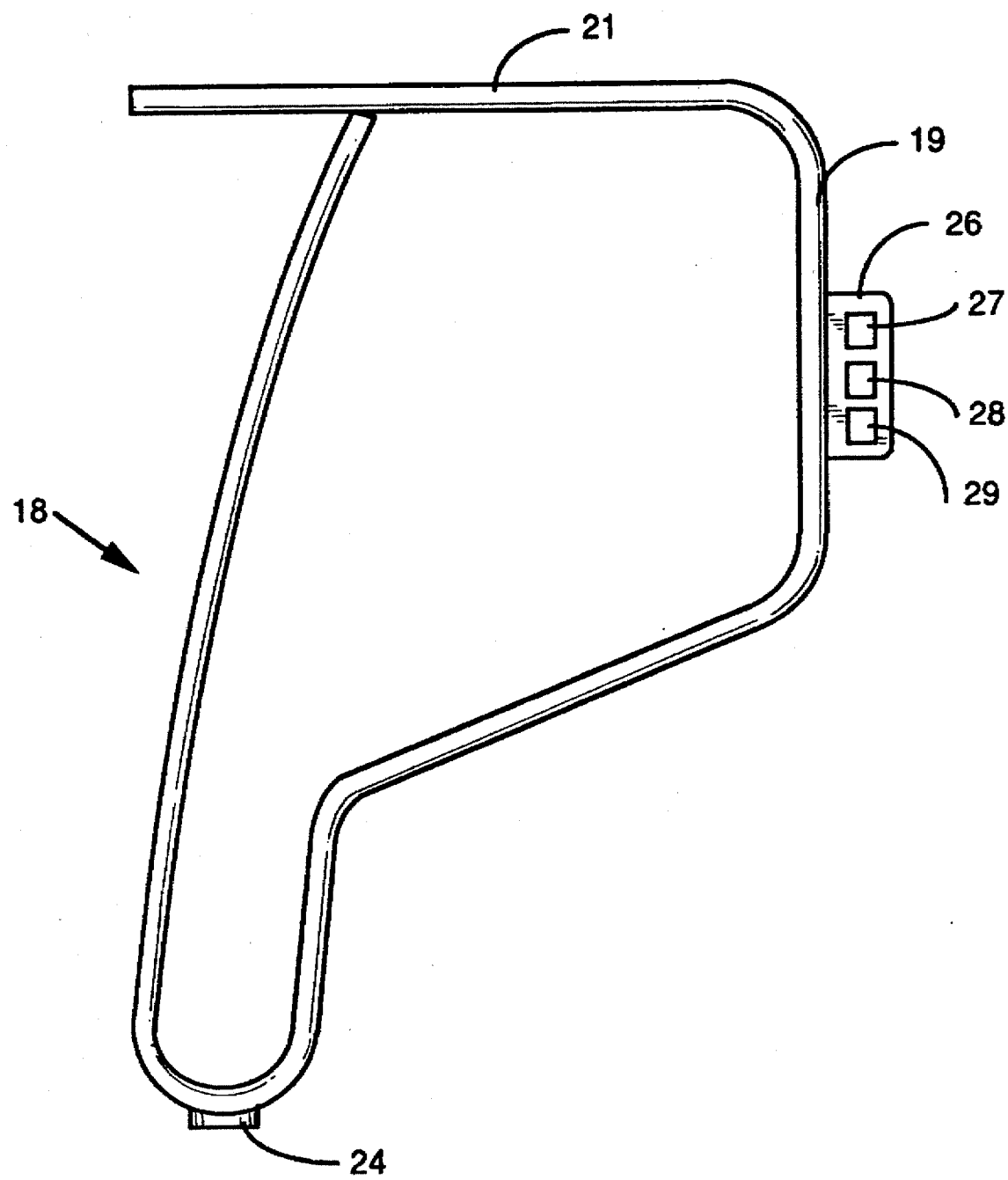
FIG. 4 is a front plan view of a leg member of the leg assembly of FIG. 1 having the tab bracket component of the present invention disposed thereon.

Referring now to FIGS. 2–4, the connecting apparatus 13 of the illustrated preferred embodiment of the present invention comprises a tab bracket 26 disposed on each leg member 18 and ganging brackets 30 for connecting together the tab brackets disposed on the leg members 18, as shown in FIG. 2. Each tab bracket 26 defines three rectangular holes 27, 28, and 29. Further, each ganging bracket 30 comprises an arcuate central portion 32 having ear portions 34 integrally disposed on both sides thereof. As will be appreciated by those skilled in the art, the central portion 32 of ganging bracket 30 may alternatively be shaped differently so that the assembled ganging brackets 30 form something other than the circular shape shown in FIG. 2, such as a square or rectangle. Each of the ears 34 has at least one shear tab 38 which matingly engages with one of the rectangular holes 27, 28, or 29 in the tab bracket 26 when the components of the connecting apparatus 13 are assembled (as shown in FIGS. 2 and 3).

In the illustrated embodiment, a shear tab 38 is located above and below the square hole 36 in each ear 34 of the ganging bracket 30. As shown in FIG. 3, when the ears 34 of two separate ganging brackets 30 are aligned with a tab bracket 26 of one of the leg members 18, the center, square holes 36 in the opposing ears 34 are aligned with the middle rectangular hole 28 in the tab bracket 26. Such alignment of the square holes 36 and the middle hole 28 allows carriage bolt 40 to be received through the ganging brackets 30 and tab bracket 26 so that such components can be positively and removably connected by a connecting means, such as a carriage bolt 40 and nut 42. As shown in FIG. 2, the connecting apparatus 13 of the illustrated and preferred embodiment of the present invention comprises four ganging brackets 30 engaged and fastened with four tab brackets 26, one on each of the four leg members 18. Those skilled in the art will appreciate that the required number of tab brackets 26 and ganging brackets 30 will vary with the number of legs comprising the leg assembly for a particular table. Those skilled in the art will also acknowledge that the connecting apparatus 13 of the present invention reduces the number of bolts or similar fasteners necessary to provide a strong and stable table leg assembly. In this regard, the arrangement of the shear tabs 38 matingly engaged with the rectangular holes in the tab brackets 26 provides additional support for each leg member 18 of the leg assembly 11. Such arrangement also inhibits the rotational movement of an individual leg member 18 with respect to the leg assembly 11 which could cause the assembly to become unbalanced and/or unstable.

The means for adjusting the relative height of each leg member 18 are incorporated in the shear tab/rectangular hole engagement between the ears 34 and the tab brackets 26. Because such holes 27, 28, and 29 in each tab bracket 26 are rectangular or elongated with respect to the square shear tabs 38, an individual leg may be adjusted upward or downward with respect to the other legs of the assembly. Such movement of an individual leg is possible because the shape of the holes 27 and 29 allows the shear tabs 38 disposed therein to slide up or down in said rectangular holes before the carriage bolt 40 and nut 42 are firmly connected. The vertical length of the rectangular holes 27, 28, and 29 can be varied in accordance with the degree of adjustability desired. Here again, those skilled in the art will recognize that shear tabs and holes of various shapes, other than square or rectangular (i.e., round or elliptical), can be employed without departing from the spirit and/or scope of the present invention.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

We claim:

1. A table leg assembly, comprising:

a plurality of leg members;

a tab bracket disposed on each of said leg members, each tab bracket defining a plurality of holes;

a plurality of ganging brackets each comprising a central portion located between a pair of ears, each of said ears defining at least one hole; and wherein when each of said tab brackets is disposed between a first ear of a first ganging bracket and a second ear of a second ganging bracket such that a first hole of said plurality of holes defined by said tab bracket and said at least one hole in each of said first and second ears are aligned to receive a connector, at least one shear tab disposed on either of said first or second ears is received within a second hole of said plurality of holes defined by said tab bracket.

2. The table leg assembly of claim 1 wherein said second hole is elongated with respect to said at least one shear tab received within said second hole.

3. A table leg assembly, comprising:

a plurality of leg members;

a tab bracket disposed on each of said leg members, each tab bracket defining a plurality of holes;

a plurality of ganging brackets each comprising a central portion located between a pair of ears, each of said ears defining at least one hole and first and second shear tabs; and connecting means for removably connecting at least two of said ganging brackets with each of said tab brackets wherein when each of said tab brackets is disposed between a first ear of a first ganging bracket and a second ear of a second ganging bracket such that a first hole of said plurality of holes defined be said tab bracket and said at least one hole in each of said first and second ears are aligned to receive said connecting means, and wherein said first and second shear tabs are received within a second hole and a third hole, respectively, defined by said tab bracket such that said first shear tabs of said first and second ears oppose each other within said second hole and said second shear tabs of said first and second ears oppose each other within said third hole.

4. The table leg assembly of claim 3 wherein said second and third holes are elongated with respect to said first and second shear tabs, respectively.

5. A table leg assembly, comprising:

a plurality of leg members;

a tab bracket disposed on each of said leg members, each tab bracket defining a plurality of holes;

a plurality of ganging brackets each comprising a central portion located between a pair of ears, each of said ears defining at least one hole; and connecting means for removably connecting at least two of said plurality of ganging brackets with each of said tab brackets, wherein when each of said tab brackets is disposed between a first ear of a first ganging bracket and a second ear of a second ganging bracket such that a first hole of said plurality of holes defined by said tab bracket and said at least one hole in each of said first and second ears are aligned to receive said connecting means, and wherein first and second shear tabs disposed on either one of said first and second ears are received within said plurality of holes, defined by said tab bracket.

6. The table leg assembly of claim 5 wherein said first and second shear tabs are received within a second hole and a third hole, respectively, defined by said tab bracket.

7. The table leg assembly of claim 6 wherein said second and third holes are elongated with respect to said first and second shear tabs, respectively.

8. A table leg assembly, comprising:

a plurality of leg members;

a tab bracket disposed on each of said leg members, each tab bracket defining a plurality of holes;

a plurality of ganging bracket each comprising a central portion located between a pair of ears, each of said ears defining at least one hole; and connecting means for removably connecting at least two of said ganging brackets with each of said tab brackets wherein when each of said tab brackets is disposed between a first ear of a first ganging bracket and a second ear of a second ganging bracket such that a first hole of said plurality of holes defined by said tab bracket and said at least one hole in each of said first and second ears are aligned to receive said connecting means, and wherein a first shear tab disposed on either of said first or second ears, and a second shear tab disposed on either of said first or second ears are received within said plurality of holes.

9. The table assembly of claim 8 wherein first and second shear tabs are received within a second hole and a third hole, respectively, defined by said tab bracket.

10. The table assembly of claim 9 wherein said second and third holes are elongated With respect to said first and second shear tabs.

* * * * *